March 3, 1936.  H. C. LORD ET AL  2,032,707
MOUNTING FOR ROTATING DEVICES
Original Filed June 23, 1931
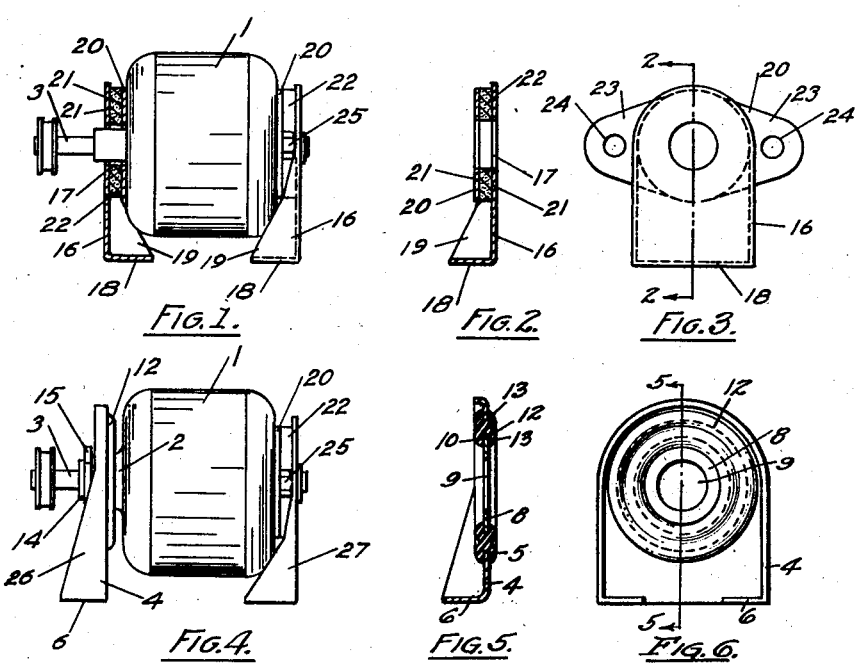
INVENTORS
Hugh C. Lord
and Thomas Lord
BY
T. L. Lord
ATTORNEYS.

Patented Mar. 3, 1936

2,032,707

UNITED STATES PATENT OFFICE 2,032,707

MOUNTING FOR ROTATING DEVICES

Hugh C. Lord and Thomas Lord, Erie, Pa.; said Thomas Lord assignor to said Hugh C. Lord Original application June 23, 1931, Serial No. 546,214, now Patent No. 1,996,210, dated April 2, 1935. Divided and this application November 3, 1933, Serial No. 696,528

7 Claims. (Cl. 248—26)

The present invention is a division of application, Serial Number 546,214, filed June 23, 1931, now Patent No. 1,996,210 of April 2, 1935.

The present invention is designed to improve mountings reducing vibration of rotating bodies subjected to torque variations. It is of particular advantage with relation to electrical machines, such as generators and motors. With such apparatus the pulsations induce torque vibrations and other factors, such as unbalanced conditions due to vibrations, involve some radial displacement. With the present invention the torque vibrations are accommodated by rubber in shear also the radial vibrations. The rubber in shear permits of the use of a comparatively large mass of rubber with comparative stability for the rotating device and still sufficient sensitiveness to readily absorb a large portion of the vibrations. Features and details of the invention will appear from the specification and claims.

Preferred embodiments of the invention are illustrated in the accompanying drawing as follows:—

Fig. 1 an elevation of a motor, partly in section, showing a modification.

Fig. 2 a section on the line 2—2 in Fig. 3 showing one of the mountings used in the modification.

Fig. 3 an elevation of the mounting.

Fig. 4 shows a side elevation of a modified mounting support for a motor.

Fig. 5 is a section on the line 5—5 in Fig. 6.

Fig. 6 is an elevation of a mounting for the power take-off end of the motor.

I marks an electric device having torque induced pulsations such as a motor, or generator. The motor is supported at each end by a plate 16 having an opening 17 therethrough. A flange 18 forms a base and a web 19 stiffens this base. A second plate 20 is ordinarily provided with an opening and the plates 16 and 20 have opposing surfaces 21. The space between these surfaces is bridged by an annular rubber member 22 preferably bonded to these surfaces 21 during vulcanization of the rubber. The plate 20 has ears 23 with perforations 24 through which bolts 25 extend for securing the ears 23 and consequently the plate 20 to the motor. The axis of the motor, or electric instrument extends through the opening in the plates.

With this mounting the rubber so disposed as to receive both the radial and torque thrusts in shear. It is particularly advantageous with electric devices and stationary installations in that it is very sensitive not only to the torque vibrations, but also to unbalanced conditions and is not subjected to abnormal radial strains. It is under ordinary conditions, therefore, a preferable form of mounting for this environment.

It will be noted that the rubber member is arcuate in form and extends at least through a major portion of an annulus. This is preferable in that continuity of the bonded surfaces gives greater strength with the same mass of rubber in that failure of the bond starts at the exposed edges and it is of sufficient area to accomplish in a single unit the necessary support for the rotating member. Where the supporting and rubber members form a complete annulus there are no bonded edges extending in a circumferential direction and, therefore, greater strength and a more uniform support is provided. It is preferable also to sustain the entire weight of the rotating device in the plane of the mounting through a single mounting and this is accomplished in this device. It is also preferable to sustain the entire thrusts on the mounting in substantially free shear throughout the member and this is more responsive than where a portion of the member is subjected to other stresses.

In some installations it is preferable to combine the joint support shown in Figs. 1, 2 and 3 at one end of the motor and provide the opposite end, or power take-off end, of the motor with a mounting that has greater stability. To this end the mounting disclosed in the application of which this case is a division, Fig. 10, of Patent No. 1,996,210 issued on said original application satisfies this condition perfectly. This mounting comprises an upright support 4 having an opening 5 through it. A flanged bottom 6 forms a base for the mounting and a web 7 stiffens the base.

An inner plate, preferably arranged in the plane of the plate 4, has an opening 9 through it through which the shaft of the motor may extend. The outer edge 10 of the plate 8 is of smaller diameter than the opening 5 and the space between these edges is bridged by an annular rubber member 12. This rubber member extends over both faces 13 of the plates and is preferably bonded to these faces on both plates during the process of vulcanization.

Brackets 2 have screw-threaded ends 14 which extend through the opening 9 and a nut 15 is arranged on the screw threads 14 and clamps the plate 8 against the brackets.

With this construction it will be noted that the torque impulses are taken by the rubber in shear and that the unbalanced conditions, or radial thrusts, are sustained by the rubber under direct stress. Consequently it is admirably arranged to receive the torque vibrations. At the same time it tends to hold the power take-off end of the motor in a more definitely located axial position. As shown, the take-off is in the form of a belt pulley arranged on the shaft 3, but the power take-off is not limited to this manner of take-off. At the opposite end of this motor rubber in radial shear between annular plates as shown in Figs. 1, 2 and 3 is used and the motor is mounted on this joint, or mounting, in the same manner as shown at the end opposite the power take-off end in Figs. 1, 2 and 3. This gives radial freedom to respond freely to unbalanced conditions and also responds freely in shear to torque vibration. Thus the combined action of the mountings on the opposite ends is to give a reasonable freedom to the motor by reason of the radial shear mounting at the end opposite the take-off and a reasonable stability at the power take-off end with shear freedom as to both ends to respond to torque.

What we claim as new is:—

1. Means for mounting a device having rotating parts inducing torque reactions as an incident to its operation comprising supported and supporting spaced apart arcuate members including a major portion of an annulus with opposing surfaces facing axially of the rotating parts and through which the axis of the rotating parts extends; and a member of resilient material arranged between the opposing surfaces and bonded to at least one of the opposing surfaces by a surface union extending continuously throughout a major portion of the annulus, said material being disposed in shear radially and receiving the major portion of the torque reactions through shear of the rubber.

2. Means for mounting a device having rotating parts inducing torque reactions as an incident to its operation comprising supported and supporting spaced apart annular members with opposing surfaces facing axially of the rotating parts; and an annular member of resilient material arranged between the opposing surfaces and bonded to at least one of the surfaces by a surface union extending continuously throughout the annulus, said material being disposed in shear radially and receiving the major portion of the torque reactions through shear of the rubber.

3. Means for mounting a device having rotating parts inducing torque reactions as an incident to its operation comprising supported and supporting spaced apart arcuate members including a major portion of an annulus with opposing surfaces facing axially of the rotating parts and through which the axis of the rotating parts extends; and a member of resilient material arranged between the opposing surfaces and bonded to both opposing surfaces by a surface union extending continuously throughout a major portion of the annulus, said material being disposed in shear radially and receiving the major portion of the torque reactions through shear of the rubber.

4. Means for mounting a device having rotating parts inducing torque reactions as an incident to its operation comprising supported and supporting spaced apart annular members with opposing surfaces facing axially of the rotating parts; and an annular member of resilient material arranged between the opposing surfaces and bonded to both opposing surfaces by a surface union extending continuously throughout the annulus, said material being disposed in shear radially and receiving the major portion of the torque reactions through shear of the rubber.

5. Means for mounting a device having rotating parts inducing torque reactions as an incident to its operation comprising supported and supporting spaced apart arcuate members with opposing surfaces facing axially of the rotating parts and through which the axis of the rotating parts extends; and a single member of resilient material arranged between the opposing surfaces and bonded thereto by a surface union, said resilient material being disposed in shear radially and receiving the major portion of the torque reactions through shear of the rubber and transmitting the major portion of the gravity load of the device from the supported to the supporting member.

6. Means for mounting a device having rotating parts inducing torque reactions as an incident to its operation comprising supported and supporting spaced apart arcuate members including a major portion of an annulus with opposing surfaces facing axially of the rotating parts and through which the axis of the rotating parts extends; and a single member of resilient material arranged between the opposing surfaces and bonded to at least one of the surfaces by a surface union extending continuously throughout a major portion of the annulus, said material being disposed in shear radially and receiving the major portion of the torque reactions through shear of the rubber, said resilient member being in substantially free shear radially and circumferentially throughout the member.

7. The combination with a device having rotating parts inducing torque reactions as an incident to its operation, said device having a power take-off end, of a rubber support at each end of the device, the support at the take-off end comprising arcuate outer and inner members spaced apart and extending about the axis of torque reaction, one of said members acting as the support and the other being connected to the device, one of said members at least being in the form of a sheet plate, and a rubber element overlapping and bonded to the face of the plate and extending radially beyond the edge thereof and secured to the other member of said element receiving torque thrusts in shear; and a rubber supporting means at the opposite end of the device, the rubber of said means being disposed to receive the major gravity and torque thrusts on the rubber in shear.

HUGH C. LORD.
THOMAS LORD.